United States Patent [19]
Obara et al.

[11] Patent Number: 5,924,800
[45] Date of Patent: Jul. 20, 1999

[54] BALL BEARING FOR SMALL SIZE FAN

[75] Inventors: Rikuro Obara; Motoharu Akiyama; Kenichi Usuda, all of Miyota-machi, Japan

[73] Assignee: Minebea Co., Ltd., Nagano, Japan

[21] Appl. No.: 08/800,534

[22] Filed: Feb. 18, 1997

[30]  Foreign Application Priority Data

Mar. 28, 1996  [JP]  Japan .................................. 8-003234 U

[51] Int. Cl.$^6$ ...................................................... F16C 33/41
[52] U.S. Cl. ............................................................ 384/532
[58] Field of Search .................................. 384/523, 471, 384/490, 531, 532

[56]  References Cited

U.S. PATENT DOCUMENTS

| | | | |
|---|---|---|---|
| 1,124,481 | 1/1915 | Long | 384/532 |
| 4,116,505 | 9/1978 | Stahlecker | 384/471 |
| 4,715,247 | 12/1987 | Honda et al. | 384/523 |

*Primary Examiner*—Lenard A. Footland
*Attorney, Agent, or Firm*—Oliff & Berridge, PLC

[57]  ABSTRACT

A ball bearing for a small size fan for supporting an axis of rotation of an impeller is formed of four or five balls (21), a crown-shaped cage (25), an inner ring (22), and an outer ring (23). By using an optimized number of the balls (21) under the working condition of a ball bearing for a small size fan, structually useless portions are eliminated. Further, by adopting the crown-shaped cage (25), reduction of the cost and the friction torque is attained, and a ball bearing having necessary and sufficinet durability is provided. By incorporating the ball bearing in a small size fan, reduction of the cost, simplification of the structure, and reduction of the electric power consumption of the small size fan are facilitated, thereby improving the commerciality as a small size fan.

6 Claims, 3 Drawing Sheets

BALL BEARING FOR SMALL SIZE FAN

BACKGROUND OF THE INVENTION

1. Field of the Invention

The present invention relates to improvement of a ball bearing used in a small size fan utilized in various kinds of OA apparatus and so on.

2. Description of the Related Art

Where a large number of electronic circuits are contained in a casing such as in various kinds of OA apparatus, there is a fear that heat generated by electronic components therefrom leads to breakage of the electronic components. In order to avoid this, a vent hole is provided in a side wall of the casing for attaching a small size fan therein to radiate heat generated inside the casing to the outside.

An example of a conventional, commonly employed small size fan is described in the following by referring to FIG. 3. A reference numeral 1 denotes a casing. The casing 1 comprises a cylindrical venturi portion 2, the inside of which is slantingly formed and a bearing box 3 integral with the venturi portion 2. Two ball bearing 4 and 5 are provided inside a standing portion of the bearing box 3. The inner rings of the ball bearings 4 and 5 rotatably support an axis 6. A reference numeral 7 denotes a snap ring for preventing the axis 6 from coming off.

As shown in the figure, a knurl 8 is provided by being nicked on the upper portion of the axis 6. The portion where the knurl 8 is provided is inserted in molding manner at a boss 10 of an impeller 9. A plurality of fan blades 11 are radially attached on the periphery of the boss 10. A reference numeral 12 denotes a coil spring for applying suitable thrust pre-load to an inner ring of the ball bearing 5.

As shown in the figure, the boss 10 of the impeller 9 is substantially E-shaped in section, and the fan blades 11 are attached on the periphery of the boss 10. A yoke 13 is attached on the inside of the boss 10 for holding a magnet 14 which is cylindrical and circumferentially magnetized. A disc-like PC board 15 is provided on the periphery of the standing portion of the bearing box 3 for mounting electronic circuits and a set of components for a DC brushless motor (not shown) thereon. A reference numeral 16 denotes a lead wire for supplying electric power to the electronic circuits.

A stator 20 comprising a core 17, a coil 18 wound around the core 17, and an insulator 19 for holding the core 17 is supported at a portion above the PC board 15 and inside the magnet 14.

The axial flow motor of the above structure operates as follows. When power supply voltage is supplied to the electronic circuits via the lead wire 16, the core 17 of the stator 20 is magnetized in predetermined order, and, according to the relationship between a magnetic field generated by the magnetization and a magnetic field generated by the magnet 14, the impeller 9 rotates around the axis 6. Since the rotation allows the fan blades 11 to generate air flow in a predetermined direction inside the venturi portion 2 of the casing 1, heat generated inside a casing attaching the small size fan can be radiated to the outside.

With reference to the above-mentioned small size fan, when, for example, the length of the four sides of an enclosure is 80 mm, and the axial length is 25 mm, the dimensions of the bearings 4 and 5 used therein are generally in the order of 8 mm in outer diameter, 3 mm in inner diameter, and 4 mm in thickness. As shown in FIG. 4, each of the ball bearings comprises balls 21, an innner ring 22, an outer ring 23, and a cage 24. As the ball 21, six pieces are used. With regard to the cage 24, one called a corrugated type with a claw is used.

Here, with reference to the above-mentioned small size fan, an examination of the load borne by the ball bearing revealed that the radial load is 0.2 kg at the most. With regard to the thrust load, most of the thrust load is caused by the urging power by the coil spring 12, and the pressure of the coil spring 12 is set in the order of 0.4 kg. Therefore, the basic load rating of the conventionally used ball bearing far exceeds a required value, that is, the ball bearing has excessive durability. In addition, since the cage 24 is structured to sandwich the balls with two components 24a and 24b manufactured by press molding of a steel plate, the area of the components 24a and 24b contacting with the balls 21 is large, thereby increasing the friction torque during rotation. Further, there is a disadvantage that, since the claw 24c must be clamped in order to fix the two components 24a and 24b, the number of processes in assembling increases much more.

That is, the conventional ball bearing is not the most suitable for a small size fan, and there has been room for further improvement of the ball bearing for reducing the cost, and improving durability, weight, and so on, of a small size fan.

SUMMARY OF THE INVENTION

The present invention is made in view of the above problems, and an object of the present invention is to improve the commerciality of a small size fan by providing a ball bearing which satisfies the basic load rating necessary for being used in a small size fan but which does not have excessive durability and is simple in structure.

According to the present invention to solve the above-mentioned problems a ball bearing for suporting an axis of rotation of an impeller is characterized by comprising four or five balls, a cage, an inner ring, and an outer ring. In other words, the number of the balls is optimized for the working condition of the ball bearing to get rid of bad effects due to excessive durability.

Further, according to the present invention, the cage is preferably a crown-shaped cage. By adopting a crown-shaped cage, its structure is simplified and an optimization of the area of the balls contacting with the cage is attained.

DETAILED DESCRIPTION OF THE PREFERRED EMBODIMENT

Figure 1:
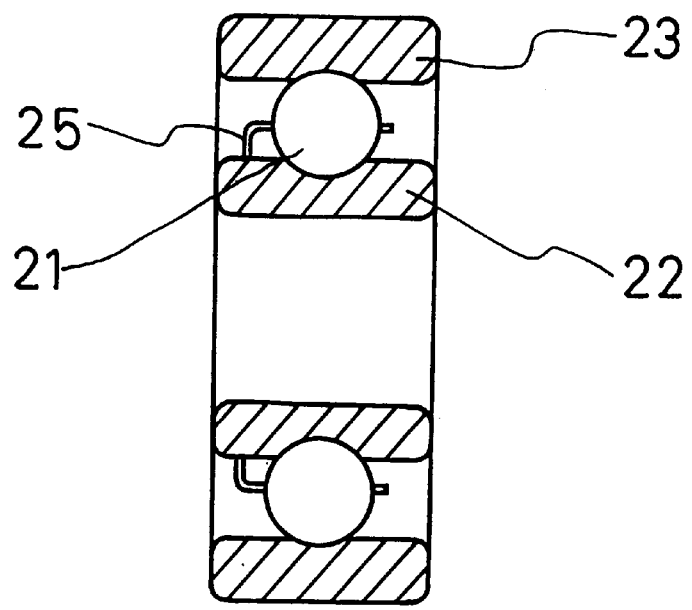
FIG. 1 is a sectional view of a ball bearing for a small size fan according to an embodiment of the present invention.

An embodiment of the present invention is now described in the following with reference to the attached drawings. Like reference numerals designate like or corresponding parts of the conventional ball bearing, and descriptions in detail thereof are omitted.

Figure 2:
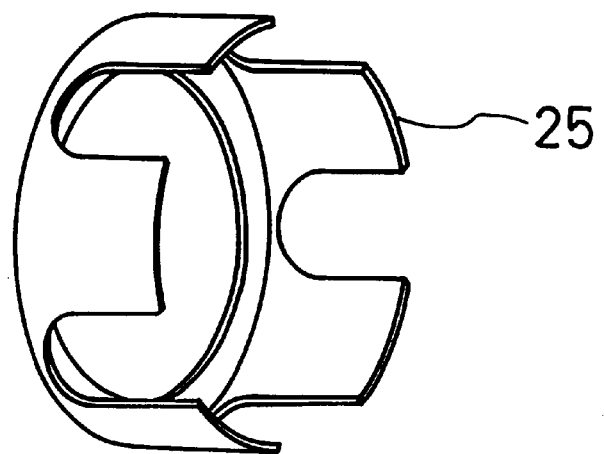
FIG. 2 is a perspective view of a crown-shaped cage used in the ball bearing for a small size fan shown in FIG. 1.
Figure 3:
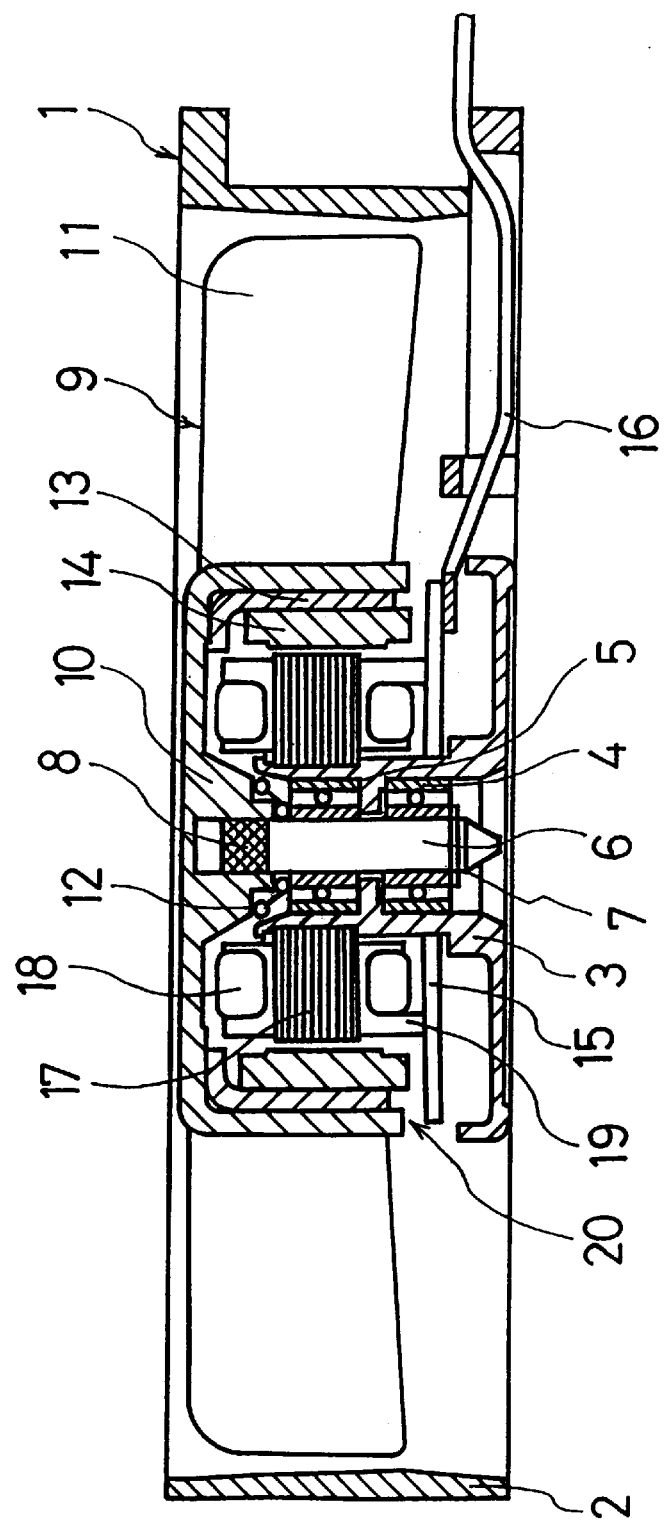
FIG. 3 is a partial sectional view of a small size fan.
Figure 4:
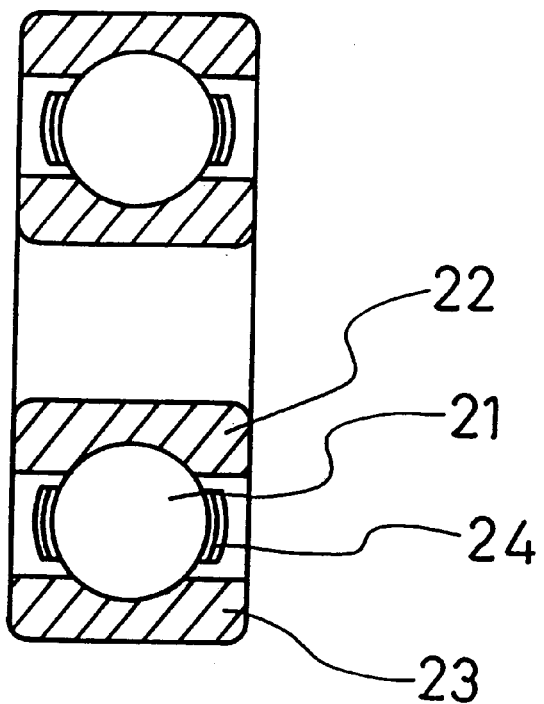
FIG. 4 is a sectional view of a conventional ball bearing for a small size fan.
Figure 5:
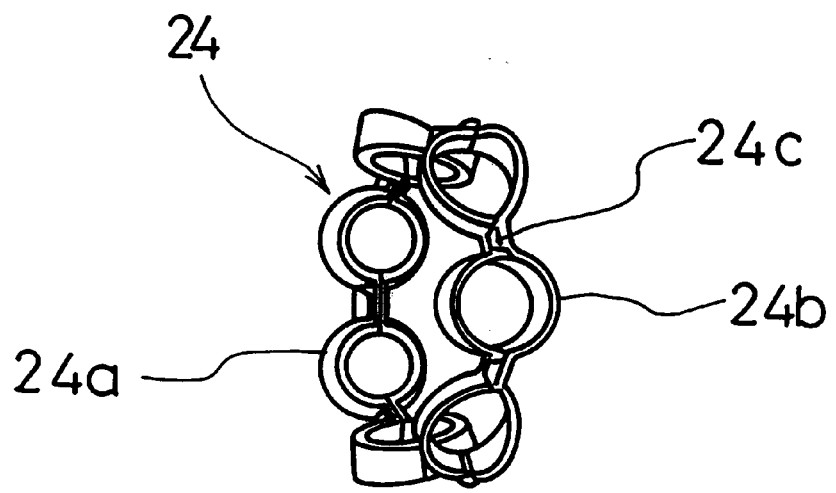
FIG. 5 is a perspective view of a cage of a corrugated type with a claw used in the ball bearing for a small size fan shown in FIG. 4.

FIG. 1 is a sectional view of a ball bearing according to an embodiment of the present invention. The ball bearing can be, in the same way as the ball bearings 4 and 5 shown in FIG. 3, incorporated in a small size fan. The ball bearing shown in FIG. 1 is composed of balls 21, an inner ring 22, an outer ring 23, and a cage 25. The number of the balls 21 used in the ball bearing is four or five. FIG. 2 shows a cage 25 used in the ball bearing shown in FIG. 1. The cage is called a crown-shaped type. The cage is formed by press molding of a steel plate or is formed with resin. While the cage 25 can not hold the balls by itself, by using the cage 25 in combination with the inner ring 22 and the outer ring 23, the balls can be held in a desired state. Advantages of a crown-shaped cage is that it is simple in structure and the manufacturing cost can be reduced. In addition, since the contact area with the balls 21 is small, the friction torque during rotation can be reduced.

When the structure shown in FIG. 1 is employed in a ball bearing the dimensions thereof being in the order of 8 mm in outer diameter, 3 mm in inner diameter, and 4 mm in thickness, used in a small size fan with the length of the four sides of the enclosure being 80 mm, respectively, and the axial length thereof being 25 mm, demonstration experiments by the inventors of the present invention and others have revealed that, in case the number of the balls 21 is five, the basic load rating is 50 kg. The value is necessary and sufficient with respect to the values of the radial load of 0.2 kg or less and of the thrust load of in the order of 0.4 kg borne by the ball bearing. In addition, as mentioned in the above, since the crown-shaped cage is used, the structure is simple, the cost is reduced, and the friction torque can be reduced. Further, since the number of the balls is reduced, the sum total of the area of the cage 25 contacting with the balls 21 can become smaller to contribute to reduction of the friction torque, and thus, the ball bearing has very suitable characteristics as a ball bearing for a small size fan.

Further, according to the working condition and the required life, the ball bearing can be selected as a single shielded bearing or a double shielded bearing. Thus, by using a ball bearing for a small size fan according to an embodiment of the present invention, not only reduction of the cost of the ball bearing and reduction of the driving torque due to the reduction of the friction torque are attained, but also reduction of the cost, simplification of the structure, and reduction of the electric power consumption of a small size fan are attained, and thus, a small size fan with high commerciality can be provided.

Since the present invention is constructed as above, the present invention has the following effects. While a conventional ball bearing has been given too much durability for a ball bearing of a small size fan, by using an optimized number of balls on the basis of the working condition, structually useless portions are eliminated in a ball bearing according to the present invention, and further, by adopting a crown-shaped cage, reduction of the cost and of the friction torque is attained, and a ball bearing having necessary and sufficient durability can be provided. Therefore, reduction of the cost, simplification of the structure, and reduction of the electric power consumption of a small size fan itself for incorporating the ball bearing therein are facilitated, thereby improving the commerciality as a small size fan.

What is claimed is:

1. A ball bearing for a small size fan for supporting an axis of rotation of an impeller comprising:

four or five balls;

an inner ring and an outer ring, provided coaxially and between which the balls are moved circumferentially and prevented from being moved axially; and a crown-shaped cage having a ring-shaped base and, at an outer periphery of the ring-shaped base, which exists between the inner and outer rings, extending walls that extend in an axial direction from the ring-shaped base, the extending walls having a uniform width and curvature in a circumferential direction which prevents each extending wall from breaking, the extending walls being spaced apart evenly in the circumferential direction so as to form openings, each one of the openings accommodating one of the balls therein, each extending wall being continuously connected to adjacent extending walls at a proximal end of the ring-shaped base in the circumferential direction such that the ring-shaped base is formed to be L-shaped in any radial sectional view, thereby providing the crown-shaped cage with increased mechanical strength to secure the balls.

2. The ball bearing according to claim 1, wherein each extending wall terminates at an unattached free end.

3. A ball bearing according to claim 1, wherein each of the openings formed by the extending walls have a uniform width in the circumferential direction.

4. A ball bearing according to claim 1, wherein the cage is comprised of steel or resin.

5. A ball bearing according to claim 1, wherein the cage is comprised of press molded steel.

6. The ball bearing according to claim 1, wherein an inner diameter of the ring-shaped base is at least as wide as an outer diameter of the inner ring.

\* \* \* \* \*